(12) United States Patent
Kim et al.

(10) Patent No.: US 11,257,467 B2
(45) Date of Patent: Feb. 22, 2022

(54) METHOD FOR CONTROLLING DEPTH OF OBJECT IN MIRROR DISPLAY SYSTEM

(71) Applicant: Samsung Electronics Co., Ltd., Gyeonggi-do (KR)

(72) Inventors: Do Hyoung Kim, Seoul (KR); Min Kyu Jung, Seoul (KR); Hyung Geol Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/764,515

(22) PCT Filed: Aug. 23, 2018

(86) PCT No.: PCT/KR2018/009749
§ 371 (c)(1),
(2) Date: May 15, 2020

(87) PCT Pub. No.: WO2019/112147
PCT Pub. Date: Jun. 13, 2019

(65) Prior Publication Data
US 2020/0372878 A1 Nov. 26, 2020

(30) Foreign Application Priority Data

Dec. 7, 2017 (KR) ........................ 10-2017-0167595

(51) Int. Cl.
*G09G 5/37* (2006.01)
*G06F 3/01* (2006.01)

(52) U.S. Cl.
CPC ............... *G09G 5/37* (2013.01); *G06F 3/017* (2013.01); *G09G 2320/066* (2013.01);
(Continued)

(58) Field of Classification Search
CPC .. G09G 5/37; G09G 2354/00; G09G 2380/10; G09G 2340/0464; G09G 5/38
See application file for complete search history.

(56) References Cited

U.S. PATENT DOCUMENTS

| 8,670,816 B2 * | 3/2014 | Green | A61B 5/72 600/424 |
| 8,743,051 B1 * | 6/2014 | Moy | G09G 5/00 345/156 |

(Continued)

FOREIGN PATENT DOCUMENTS

| JP | 2010-70889 A | 4/2010 |
| KR | 10-2014-0119999 A | 10/2014 |

(Continued)

*Primary Examiner* — Olga V Merkoulova
(74) *Attorney, Agent, or Firm* — Cha & Reiter, LLC

(57) ABSTRACT

Disclosed is a mirror display system. The mirror display system includes a sensor module, a mirror display including an optical mirror and a display, and at least one control circuit electrically connected to the sensor module and the mirror display, wherein the at least one control circuit may determine a first angle value indicating a graze direction of a user reflected in the optical mirror through the sensor module, determine a distance value between a subject reflected in the optical mirror and the mirror display, determine a depth value of the subject on the mirror display based on the first angle value and the distance value, and display an object having a depth value corresponding to the depth value of the subject through the display.

11 Claims, 9 Drawing Sheets

(52) U.S. Cl.
CPC ............... *G09G 2320/0626* (2013.01); *G09G 2320/0666* (2013.01); *G09G 2340/0464* (2013.01); *G09G 2354/00* (2013.01)

(56) References Cited

U.S. PATENT DOCUMENTS

| | | | | |
|---|---|---|---|---|
| 2008/0030578 A1* | 2/2008 | Razzaque | ............ | A61B 8/5238 |
| | | | | 348/143 |
| 2009/0226069 A1* | 9/2009 | Razzaque | .............. | A61B 34/20 |
| | | | | 382/131 |
| 2011/0251483 A1* | 10/2011 | Razzaque | .......... | A61B 18/1477 |
| | | | | 600/424 |
| 2012/0072873 A1 | 3/2012 | Park et al. | | |
| 2013/0260360 A1 | 10/2013 | Baurmann et al. | | |
| 2014/0292748 A1 | 10/2014 | Ban et al. | | |
| 2014/0300634 A1 | 10/2014 | Cho et al. | | |
| 2015/0002507 A1* | 1/2015 | Ambrus | .................. | G06T 19/00 |
| | | | | 345/419 |
| 2015/0248793 A1* | 9/2015 | Abovitz | ............. | G06K 9/00711 |
| | | | | 345/633 |
| 2016/0026253 A1* | 1/2016 | Bradski | ................ | H04N 13/344 |
| | | | | 345/8 |
| 2016/0154269 A1* | 6/2016 | Fukuoka | .............. | G02F 1/13306 |
| | | | | 345/690 |
| 2017/0024885 A1* | 1/2017 | Miyazaki | ................ | A45D 44/00 |
| 2017/0053456 A1 | 2/2017 | Cho et al. | | |
| 2017/0188020 A1 | 6/2017 | Sakai et al. | | |
| 2017/0206691 A1* | 7/2017 | Harrises | ............. | G02B 27/0172 |
| 2017/0235372 A1 | 8/2017 | Song et al. | | |
| 2017/0242252 A1* | 8/2017 | Ide | ........................ | G02B 26/101 |
| 2019/0011712 A1* | 1/2019 | Nagano | .............. | G02B 27/0101 |
| 2019/0371028 A1* | 12/2019 | Harrises | .................. | G06T 11/60 |

FOREIGN PATENT DOCUMENTS

| | | |
|---|---|---|
| KR | 10-2016-0148769 A | 12/2016 |
| KR | 10-1728775 B1 | 4/2017 |
| KR | 10-1732890 B1 | 5/2017 |
| KR | 10-2017-0096420 A | 8/2017 |

* cited by examiner

METHOD FOR CONTROLLING DEPTH OF OBJECT IN MIRROR DISPLAY SYSTEM

CROSS REFERENCE TO RELATED APPLICATIONS

This application is a National Phase Entry of PCT International Application No. PCT/KR2018/009749, which was filed on Aug. 23, 2018, and claims a priority to Korean Patent Application No. 10-2017-0167595, which was filed on Dec. 7, 2017, the contents of which are incorporated herein by reference.

TECHNICAL FIELD

Embodiments of the disclosure relate to a method for controlling a depth of an object in a mirror display system.

BACKGROUND ART

A mirror display may include an optical mirror and a display. The mirror display may provide augmented reality (AR) to a user by simultaneously displaying a mirror image represented by light reflection and an object generated through computer graphics. The mirror display may provide effective information and various multimedia services through augmented reality.

DISCLOSURE

Technical Problem

A mirror image reflected in an optical mirror of a mirror display may have a perspective (or depth) depending on the distance between the optical mirror and a subject. Meanwhile, the display of a mirror display may display an object without reflecting the perspective on a mirror. When the depth of the object is different from the depth on the mirror, the user of the mirror display may experience visual discomfort that decreases immersion or understanding of the screen displayed on the mirror display.

Various embodiments of the disclosure are to provide an apparatus for controlling a depth of an object based on a depth on a mirror in a mirror display system and a method thereof.

Technical Solution

According to an embodiment of the disclosure, a mirror display system includes a sensor module, a mirror display including an optical mirror and a display, and at least one control circuit electrically connected to the sensor module and the mirror display, wherein the at least one control circuit may determine, through a sensor module, an incident angle formed by a light reflected from a subject and a normal line of the optical mirror based on a gaze direction of a user, determine a distance value between the subject and the mirror display, determine a depth value of the subject on the mirror display based on the incident angle and the distance value, and display an object having a depth value corresponding to the depth value of the subject through the display.

According to another embodiment of the disclosure, a method of a mirror display system includes determining, through a sensor module of the mirror display system, an incident angle formed by a light reflected from a subject and a normal line of an optical mirror, based on a gaze direction of a user reflected in the optical mirror, determining a distance value between the subject and a mirror display through the sensor module, determining a depth value of the subject on the mirror display based on the incident angle and the distance value, and displaying an object having a depth value corresponding to the depth value of the subject through a display.

According to still another embodiment of the disclosure, a mirror display system includes a sensor module, a mirror display including an optical mirror and a display, and at least one control circuit electrically connected to the sensor module and the mirror display, wherein the at least one control circuit may determine, through the sensor module, a reflection angle formed by a light reflected by the optical mirror and a normal line of the optical mirror, based on a gaze direction of a user reflected in the optical mirror, determine an incident angle formed by a light reflected from a subject and a normal line of the optical mirror, determine a distance value between the subject and the mirror display, determine a depth value of the subject on the mirror display based on the incident angle and the distance value, and display an object having a depth value corresponding to the depth value of the subject through a display.

Advantageous Effects

According to the embodiments of the disclosure, the mirror display system may determine the depth of a subject based on the distance between the subject reflected in the optical mirror and the mirror display, thereby providing the user with a visual environment in which a mirror image is matched with the perspective of an object.

In addition, according to the embodiments of the disclosure, the mirror display system may match a mirror image with the perspective of an object, thereby providing the user with various augmented reality services.

In addition, various effects that are directly or indirectly understood through the present disclosure may be provided.

DESCRIPTION OF DRAWINGS

With regard to description of drawings, similar elements may be marked by similar reference numerals.

MODE FOR INVENTION

Various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
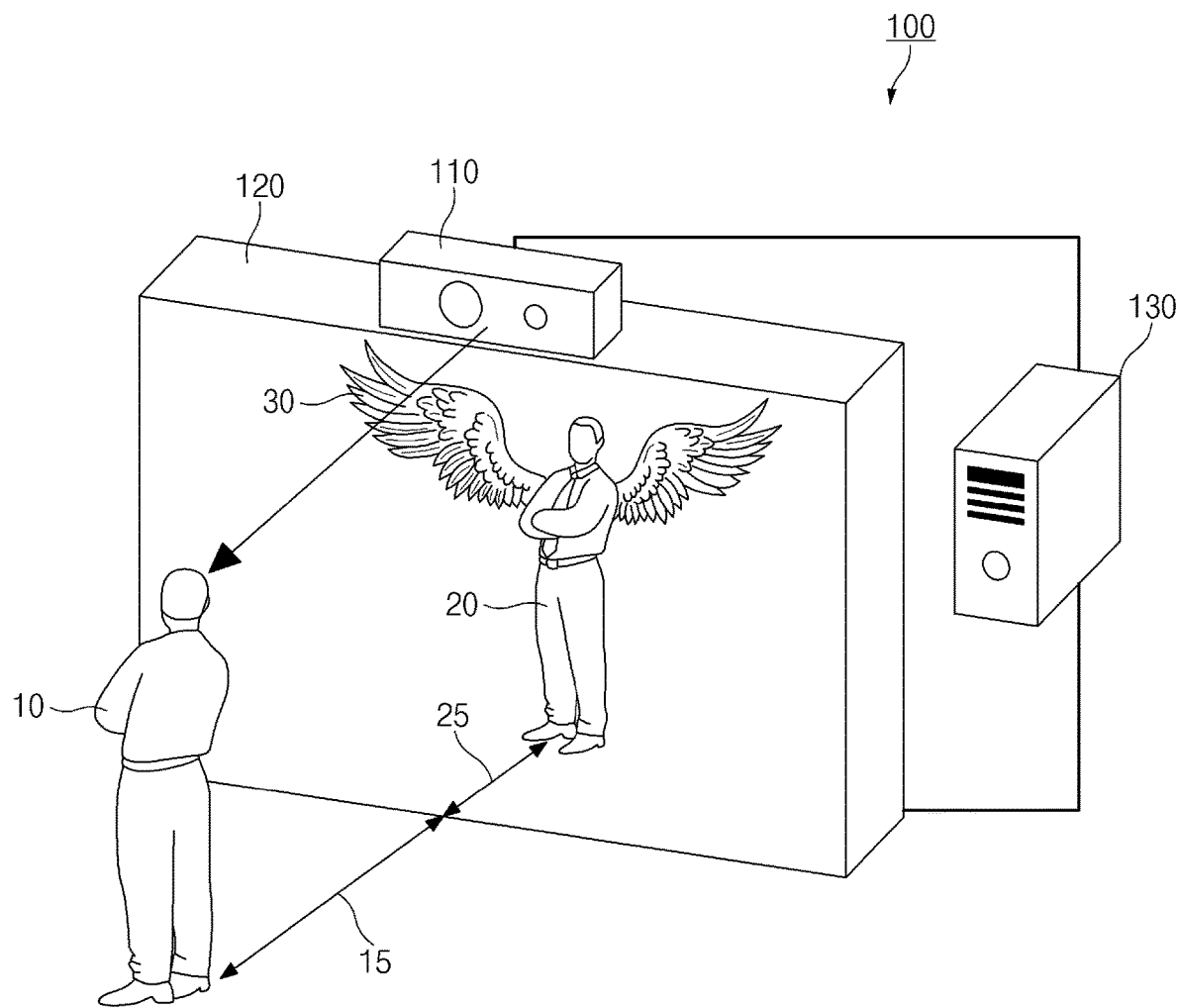
FIG. 1 illustrates a mirror display system according to various embodiments.

FIG. 1 illustrates a mirror display system according to various embodiments.

Referring to FIG. 1, a mirror display system 100 may include a sensor module 110, a mirror display 120, and at least one control circuit 130. According to an embodiment, at least one of the components illustrated in FIG. 1 may be omitted from the mirror display system 100, or the mirror display system 100 may include at least one additional component. For example, the mirror display system 110 may further include an input device for receiving a user input, a communication module for communicating with an external device, or at least one memory for storing multimedia service data.

According to an embodiment, the sensor module 110 may detect a user 10 located in front of the mirror display 120, and measure the distance (e.g., a first distance 15) between the user 10 and the mirror display 120, a location of the user 10, or a gaze direction (or a direction of the face) of the user 10. As another example, the sensor module 110 may measure the distance between a subject and the mirror display 120 or a location of the subject. In this document, the subject may include a part of the body of the user 10 or other objects that the user 10 looks through an optical mirror of the mirror display 120. For example, in FIG. 1, when the user 10 looks at the shoulder of the user 10 through the optical mirror of the mirror display 120, the subject may mean the shoulder.

According to an embodiment, there may be one sensor module 110 or more. For example, the sensor module 110 may include at least one of an infrared sensor, a light detection and ranging (LIDAR) sensor, a radio detecting and ranging (RADAR) sensor, or a camera sensor. According to an embodiment, the sensor module 110 may be attached to one side of the mirror display 120 or may be embedded in the mirror display 120.

According to an embodiment, the mirror display 120 may perform a mirror function and a display function together. For example, the user 10 may be reflected in the optical mirror included in the mirror display 120 by reflection of light as a mirror image 20. As another example, the mirror display 120 may display an object 30 formed through computer graphics through a display included in the mirror display 120. The mirror display 120 may provide augmented reality by displaying the object 30 together with the mirror image 20. The mirror image 20 reflected in the optical mirror of the mirror display 120 may have a perspective (or depth) corresponding on the distance between the user 10 and the mirror display 120. For example, the mirror image 20 may have a perspective in the optical mirror as much as a second distance 25 corresponding (e.g., the same or similar) to the length of the first distance 15 between the user 10 and the mirror display 120.

According to an embodiment, the at least one control circuit 130 may include a form of a server, an engine, a device, an apparatus, a terminal, or user equipment (UE). The at least one control circuit 130 may include a software or hardware module. For example, the at least one control circuit 130 may include at least one of application specific integrated circuits (ASICs), digital signal processors (DSPs), digital signal processing devices (DSPDs), programmable logic devices (PLDs), field programmable gate arrays (FPGAs), processors, controllers, micro-controllers, and microprocessors. Although FIG. 1 illustrates an example in which the at least one control circuit 130 is arranged outside the mirror display 120, the at least one control circuit 130 may be embedded in the mirror display 120 or coupled with the mirror display 120.

According to an embodiment, the at least one control circuit 130 may perform the overall function of the mirror display system 100. For example, the at least one control circuit 130 may determine the distance (the first distance 15) between the user 10 and the display, the location of the user 10, or the gaze direction of the user 10 through the sensor module 110. As another example, the at least one control circuit 130 may determine the angle formed by the light reflected from the subject and the normal line of the optical mirror of the mirror display 120, based on the gaze direction of the user 10. In this document, the angle formed by the light reflected from the subject and the normal line of the optical mirror may be referred to as an incident angle. The size of the incident angle may be equal to that of the reflection angle formed by the light reflected by the optical mirror and the normal line of the optical mirror. The at least one control circuit 130 may determine a depth value of another subject based at least on the determined incident angle. As another example, the at least one control circuit 130 may display the object 30 generated through computer graphics based on the measured depth value through a display.

Figure 2:
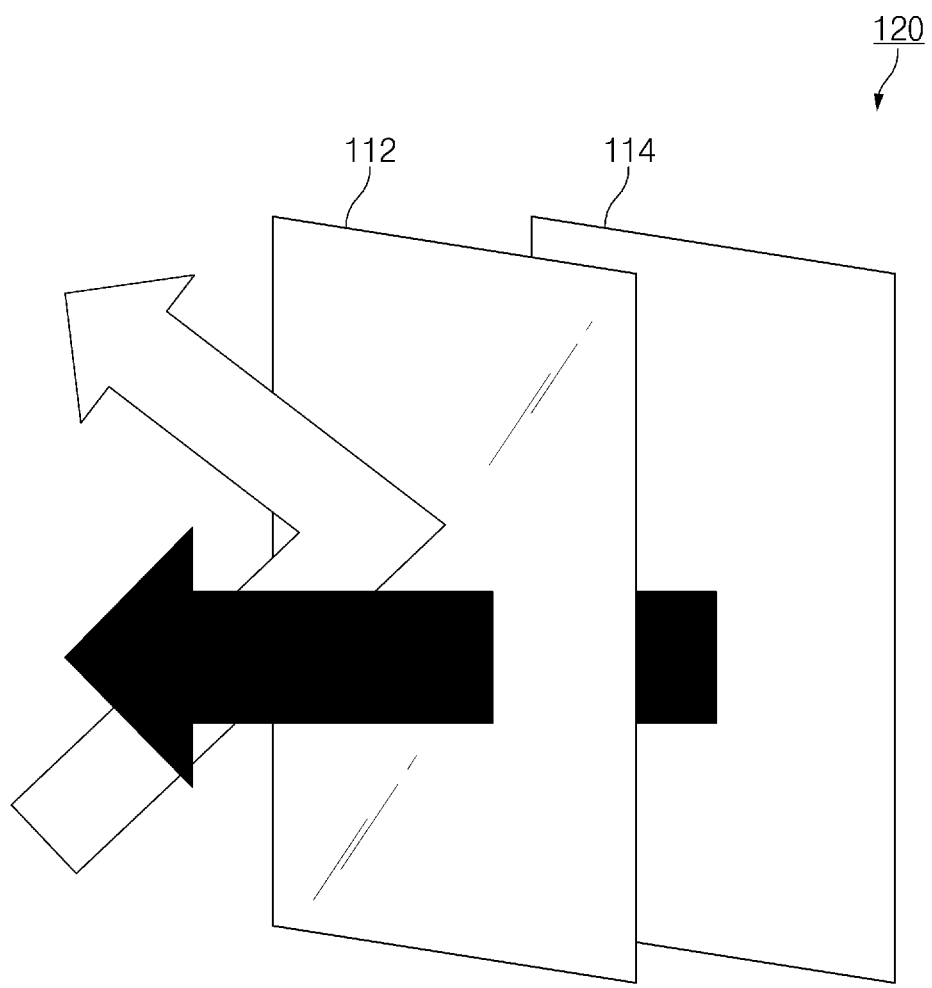
FIG. 2 illustrates a structure of a mirror display according to various embodiments.

FIG. 2 illustrates a structure of a mirror display according to various embodiments.

Referring to FIG. 2, the mirror display 120 may include an optical mirror 112 in the front, and a display 114 in the rear. According to an embodiment, the optical mirror 112 may include a half mirror capable of reflecting a part of light and transmitting the remaining part. The half mirror may include, for example, nickel, aluminum, or titanium on the glass surface. At least a part of the light coming from an outside may pass through the half mirror. According to an embodiment, the display 114 may include at least one of a liquid crystal display (LCD), an organic electro luminescence (EL), a thin film transistor-liquid crystal display (TFT LCD), an organic light emitting diode (OLED), and a plasma display panel (PDP).

Although FIG. 2 illustrates an example in which the optical mirror 112 is arranged on the front surface of the display 114, another example may be applied to the mirror display 120. For example, the mirror display 120 may include the display 114 on the front surface and the optical mirror 112 on the rear surface. The display 114 may include a transparent display. The optical mirror 112 may include a mirror film including a reflective medium. The display 114 may include an OLED or TFT LCD. As another example, the mirror display 120 may include an LCD display, and the LCD display may include a mirror film that functions as an optical mirror. The LCD display may include a back light for supplying light, a polarizer for reflecting or transmitting light supplied from the backlight corresponding to polarization, and a liquid crystal display panel for controlling polarization of light. The polarizer may include a mirror film that functions as an optical mirror.

According to an embodiment, the display 114 may include a three-dimensional (3D) display. The at least one control circuit 130 may adjust the depth of an object (e.g., the object 30 of FIG. 1) displayed by the display 114 through the 3D display. For example, the at least one control circuit 130 may adjust the depth of an object through stereoscopy using 3D glasses or autostereoscopy using both eyes of the user 10 without using 3D glasses.

Figure 3:
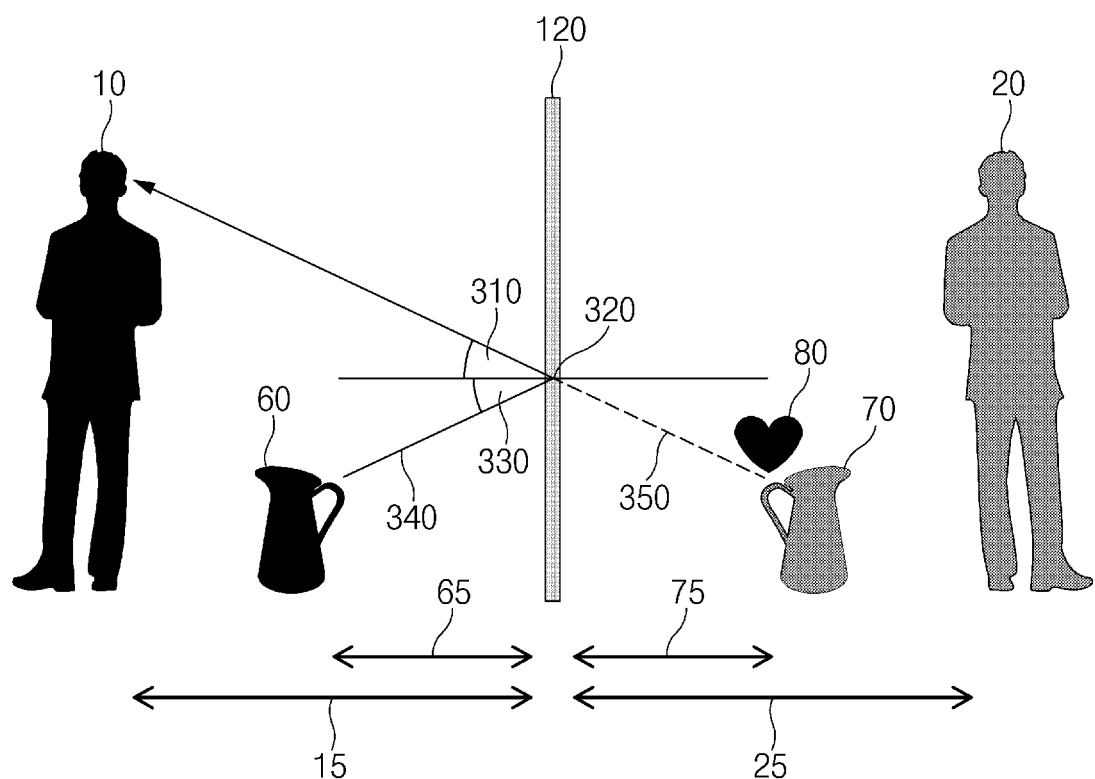
FIG. 3 illustrates an operation of determining a depth value of an object according to various embodiments.

FIG. 3 illustrates an operation of determining a depth value of an object according to various embodiments. FIG. 3 illustrates an example in which the user 10 views a subject 60 through the mirror display 120.

Referring to FIG. 3, the mirror display system 100 may determine a value of the first distance 15 indicating the distance between the user 10 and the mirror display 120 through the sensor module 110 and a value of a second distance 65 indicating the distance between the subject 60 and the mirror display 120. The mirror display system 100 may determine a depth value 25 of the mirror image 20 and a depth value 75 of a mirror image 70 reflected in the mirror display 120 depending on the determined distance values.

According to an embodiment, the mirror display system 100 may use an incident angle 330 to determine a depth value 350 of the mirror image 70 in a gaze direction of the user 10. The incident angle 330 may mean an angle formed by a direction of a light 340 reflected from the subject 60 and the normal line of the mirror display 120. Because the incident angle is equal to a reflection angle 310, the mirror display system 100 may determine the incident angle 330 through the reflection angle 310. The reflection angle 310 may mean the angle formed by the direction of the light entering the eyes of the user 10 and the normal line of the mirror display 120. The mirror display system 100 may determine the reflection angle 310 by detecting the gaze direction (or head direction) of the user 10.

According to an embodiment, the mirror display system 100 may use the second distance 65 and the incident angle 330 to determine the depth value 350 of the mirror image 70 according to the gaze direction of the user 10. For example, the angle of the depth value 350 may be equal to the incident angle 330, and the length of the depth value may be equal to the length of the light 340 reflected from the subject 60.

According to an embodiment, the mirror display system 100 may display an object 80 on the display based on the determined depth value 350. The depth value of the object 80 may be equal or similar to the depth value 350 of the mirror image 70.

Figure 4:
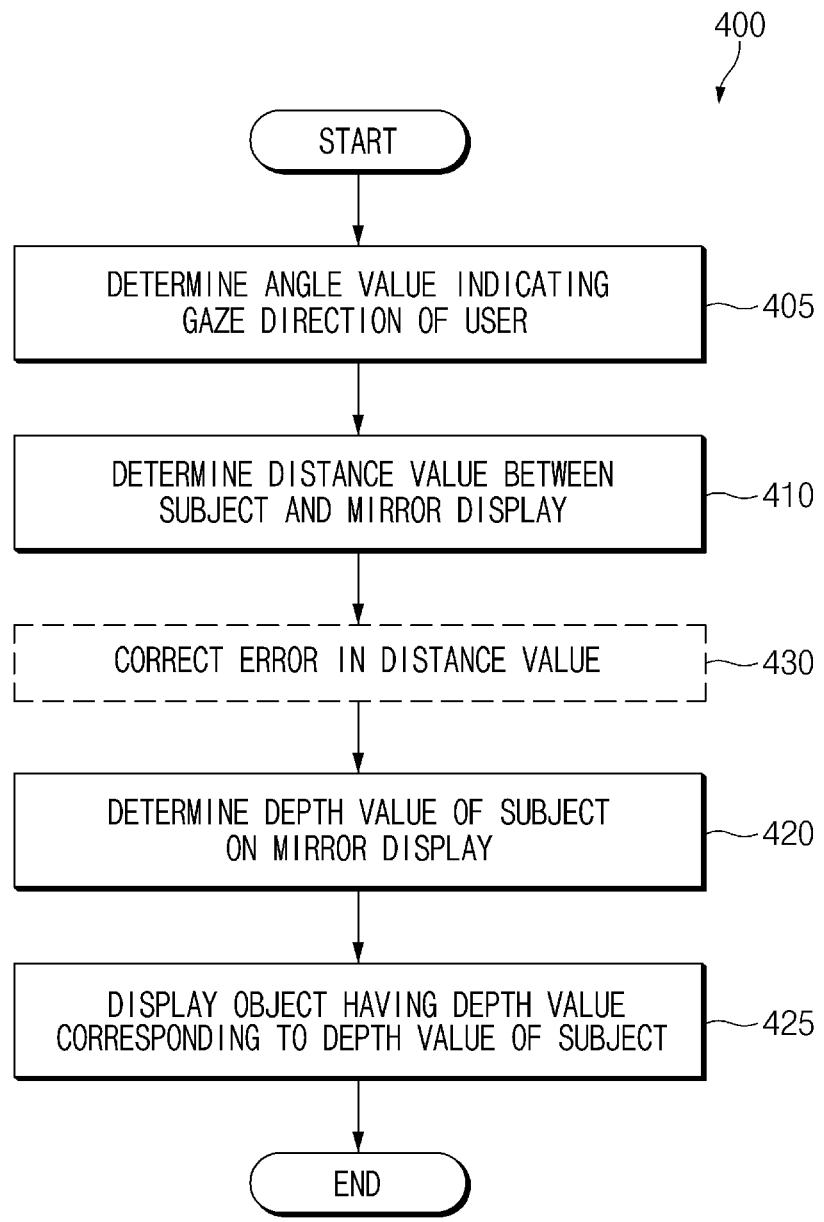
FIG. 4 illustrates a flowchart of an operation of a mirror display system for determining a depth value of an object according to various embodiments.

FIG. 4 illustrates a flowchart of an operation of a mirror display system for determining a depth value of an object according to various embodiments. The operations described below may be implemented with the mirror display system 100 or the at least one control circuit 130.

Referring to FIG. 4, in operation 405 of a method 400, the at least one control circuit 130 may determine the incident angle 330 formed by the light reflected from the subject 60 and the normal line of the optical mirror, based on the gaze direction of the user 10. According to an embodiment, the incident angle 330 may be determined based on the reflection angle 310 formed by the light reflected by the optical mirror and the normal line of the optical mirror.

In operation 410, the at least one control circuit 130 may determine a distance value (e.g., the second distance 65 of FIG. 3) between the subject 60 and the mirror display 120. For example, the at least one control circuit 130 may determine the distance value through the sensor module 110.

In operation 420, the at least one control circuit 130 may determine the depth value (e.g., the depth value 350 of FIG. 3) of the subject 60 on the mirror display 120 based on the incident angle 330 and the distance value.

In operation 425, the at least one control circuit 130 may display the object 80 having a depth value corresponding to the determined depth value on a display. For example, the depth value of the object 80 may be equal or similar to the depth value of the subject 60. According to an embodiment, the at least one control circuit 130 may use stereoscopy or autostereoscopy to control the depth of the object 80. The stereoscopy may include, for example, a polarization scheme using polarization of light, or a time division scheme of alternately displaying a screen corresponding to the left eye and a screen corresponding to the right eye. For example, the autostereoscopy may use a parallax barrier scheme by which the mirror display 120 includes a barrier for making a three-dimensional effect on one surface of the display 114, or a lenticular scheme by which the mirror display 120 includes a semicircular lens on one surface of the display 114.

According to an embodiment, in operation 430, the at least one control circuit 130 may correct an error in the distance value between the subject 60 and the mirror display 120. For example, the at least one control circuit 130 may correct an error in consideration of the location of the sensor module 110.

Through the method 400 described above, the mirror display system 100 may more clearly measure the depth value of the mirror image reflected in the optical mirror 112, and may provide a sense of unity between the mirror image and the object to the user 10 by controlling the depth value of the object displayed through the display 114 based on the depth value of the mirror image.

Figure 5:
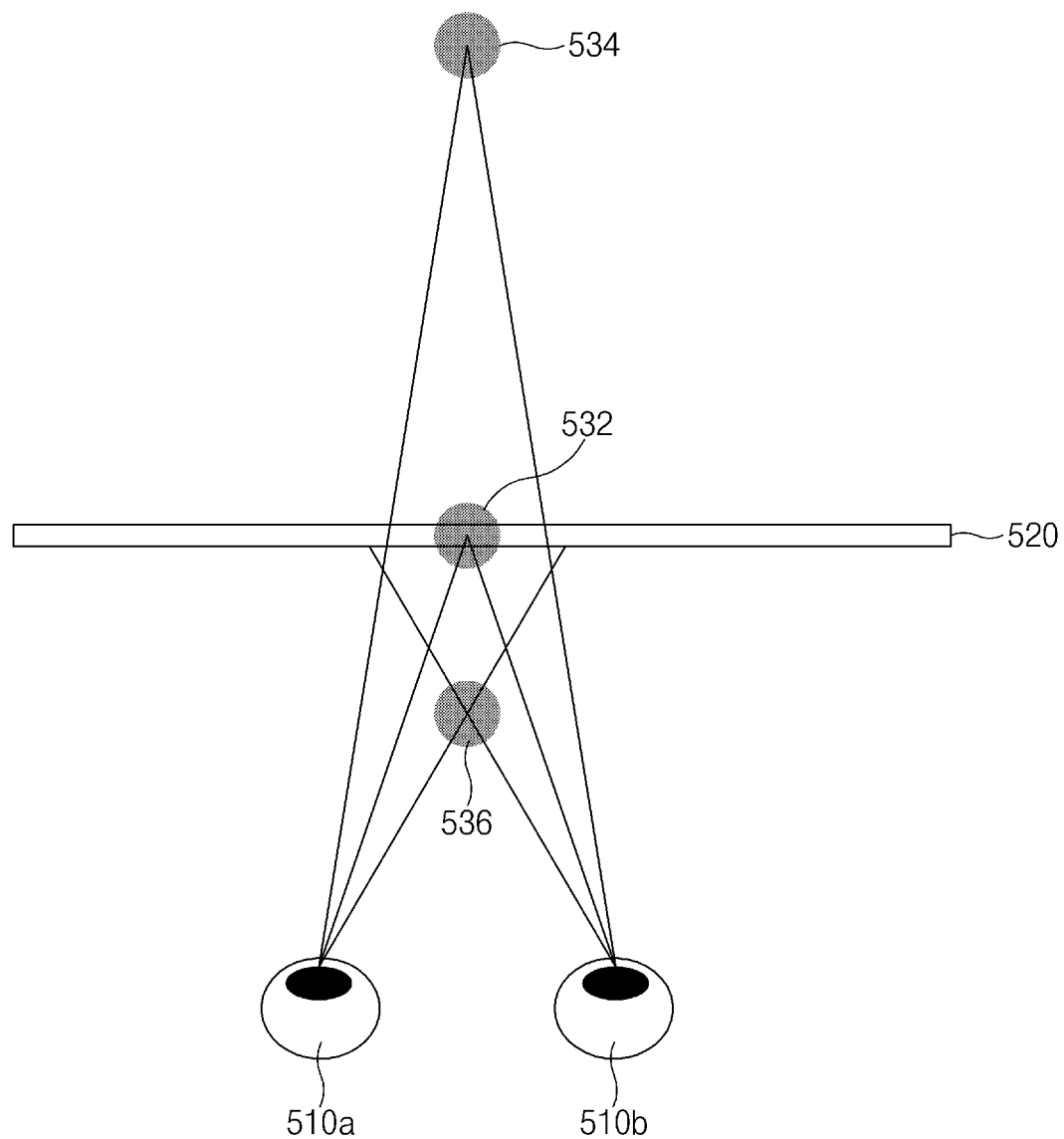
FIG. 5 illustrates an operation of displaying an object having a depth on a display according to various embodiments.

FIG. 5 illustrates an operation of displaying an object having a depth on a display according to various embodiments.

Referring to FIG. 5, the at least one control circuit 130 may display an object (e.g., the object 30 of FIG. 1 or the object 80 of FIG. 3) having a depth through a three-dimensional display 520 (e.g., the display 114) included in the mirror display 120. For example, the at least one control circuit 130 may apply the binocular parallax principle which controls to allow a perspective (or depth) of an object displayed on the 3D display 520 by a distance difference between a left eye 510*a* and a right eye 510*b* of the user 10 to look differently to the user 10.

According to an embodiment, the at least one control circuit 130 may control the 3D display 520 to change the location of the object seen by the left eye 510*a* and the right eye 510*b* of the user 10. For example, the at least one control circuit 130 may control the 3D display 520 by using stereoscopy or autostereoscopy, such that the location of the object viewed by the user 10 is displayed on a first location 536 indicating the front surface of the 3D display 520. As a similar principle, the at least one control circuit 130 may control the 3D display 520 such that the location of the object is displayed on a second location 534 indicating the rear surface of the 3D display 520 or a third location 532 indicating the same depth as the 3D display 520.

Figure 6:
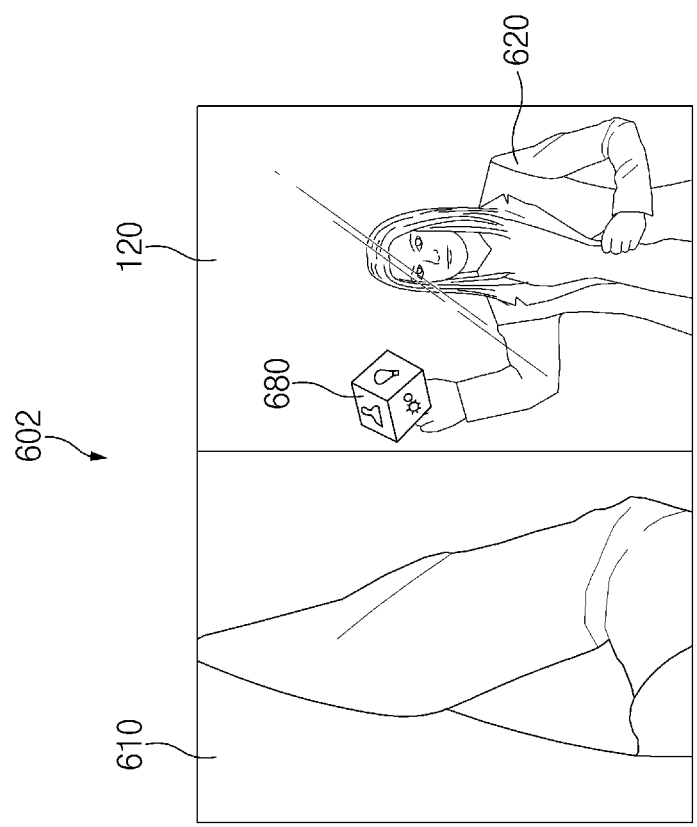
FIG. 6 illustrates an operation of detecting a gesture based on a depth value according to various embodiments.
Figure 6:
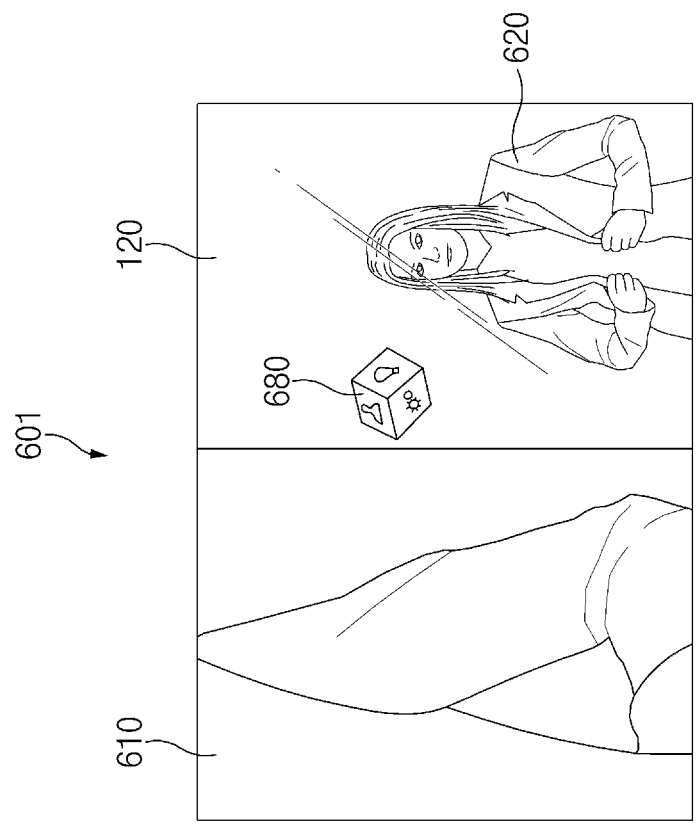

FIG. 6 illustrates an operation of detecting a gesture based on a depth value according to various embodiments.

Referring to reference numeral 601 of FIG. 6, the mirror display system 100 may display a mirror image 620 of a user 610 reflected by the light reflection through the optical mirror of the mirror display 120. According to an embodiment, the mirror display system 100 may detect the gaze direction of the user 610 through the sensor module 110 and display an object 680 having a depth value based on the detected gaze direction. According to an embodiment, the object 680 may include information about a multimedia service provided to the user 610. For example, when the mirror display system 100 is arranged in a clothing store, the object 680 may include information about clothing or accessories recommended to the user 610. As another example, the object 680 may include beauty information, interior information, health care information, or game information.

Referring to reference numeral 602 of FIG. 6, the mirror display system 100 may detect a user input for selecting the object 680. According to an embodiment, the mirror display system 100 may detect a user input through which the user 610 selects the object 680 without touching the mirror display 120. For example, the mirror display system 100 may detect a gesture of the user 610 through a sensor module (e.g., the sensor module 110). The gesture may include an operation of pointing, by the user 610, to the same coordinates as the plane coordinates (x-axis and y-axis) at which the object 680 is displayed. The mirror display system 100 may determine whether the depth value of a subject (e.g., the hand of the user 610) pointing to the object 680 is equal to that of the object 680. When the depth value of the object is equal to that of the object 680, the mirror display system 100 may control the object 680 to be moved or changed in response to the gesture action of the user 610.

Figure 7:
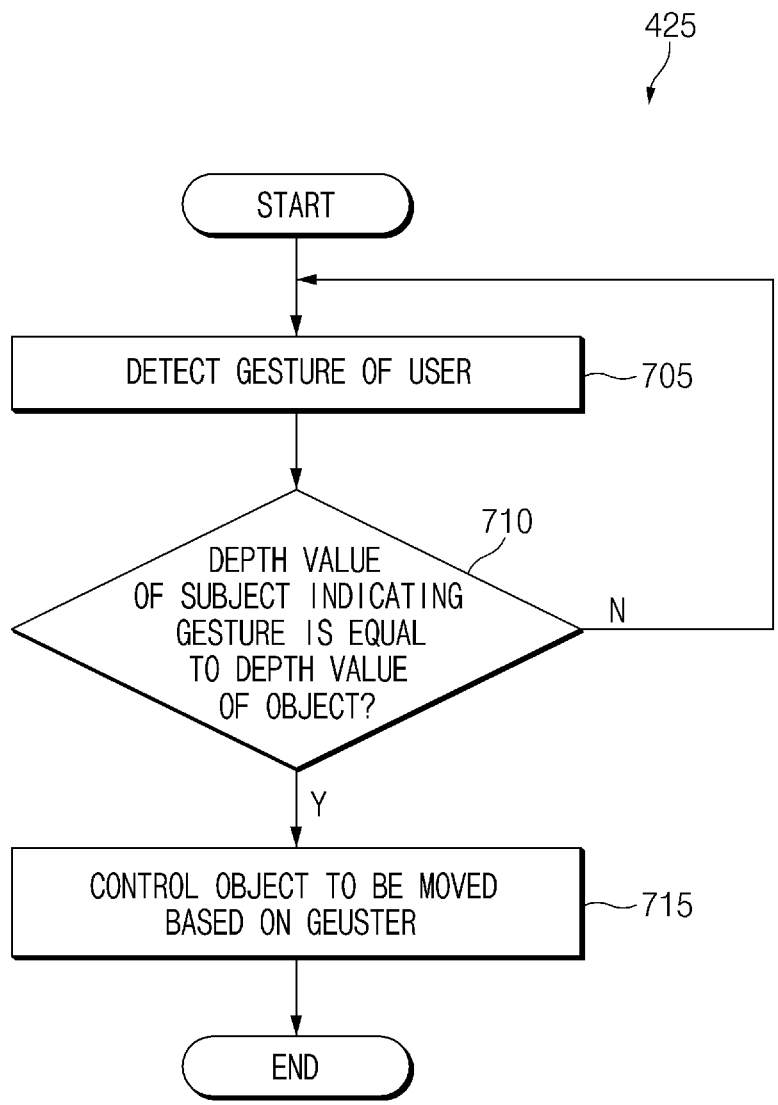
FIG. 7 is a flowchart illustrating an operation of detecting, by a mirror display system, a gesture based on a depth value according to various embodiments.

FIG. 7 is a flowchart illustrating an operation of detecting, by a mirror display system, a gesture based on a depth value according to various embodiments. FIG. 7 may include an operation by which operation 425 of FIG. 4 is implemented in more detail.

Referring to FIG. 7, in operation 705, the at least one control circuit 130 may detect a user's gesture. For example, the at least one control circuit 130 may detect a gesture of a user pointing to an object displayed on the mirror display 120 through a sensor module.

In operation 710, the at least one control circuit 130 may determine whether the depth value of the subject representing the detected gesture is equal to that of the object. According to an embodiment, the at least one control circuit 130 may determine the depth value of the subject representing the detected gesture based on the distance value between the subject and the mirror display 120 and the incident angle of light reflected from the subject. When the depth value of the subject is not equal to that of the object, the at least one control circuit 130 may repeat operations 705 and 710. When the depth value of the subject is equal to that of the object, the at least one control circuit 130 may perform operation 715.

In operation 715, the at least one control circuit 130 may control the object to move in response to the detected gesture. As another example, the at least one control circuit 130 may control the shape, color, or size of the object to be changed in response to the detected gesture.

Through the above-described method, the mirror display system 100 may more accurately detect a user input for selecting an object without a touch input, thereby providing convenience of user manipulation.

Figure 8:
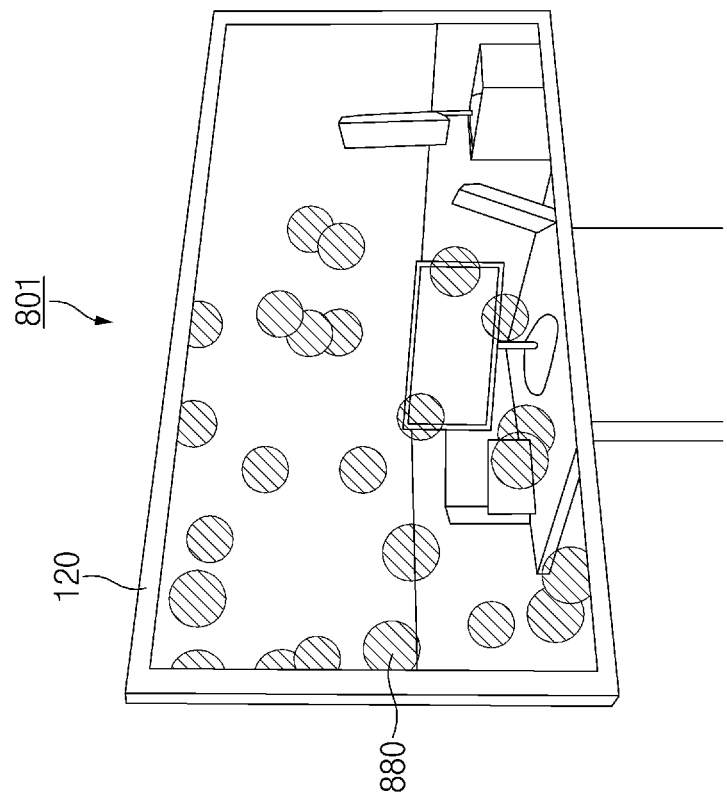
FIG. 8 illustrates an operation of changing the color or contrast of an object based on a depth value according to various embodiments.
Figure 8:
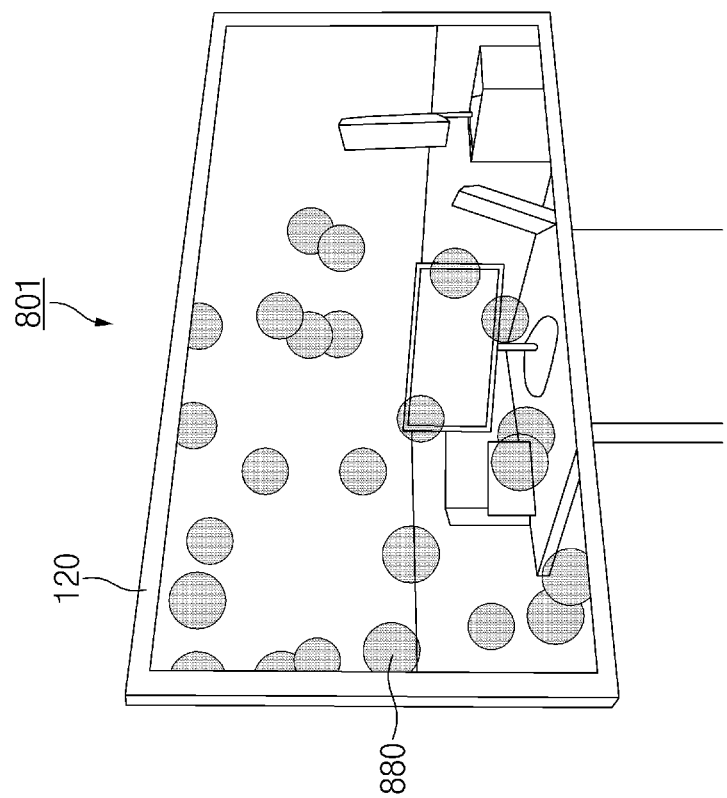

FIG. 8 illustrates an operation of changing the color or contrast of an object based on a depth value according to various embodiments.

Referring to reference numeral 801 of FIG. 8, the mirror display system 100 may display an object 880 generated by computer graphics, through the mirror display 120. The mirror display system 100 may change the color, contrast, or brightness of the object 880 based on the depth value. For example, when the depth value of the object 880 is greater than the depth values of other subjects (i.e., when the object 880 is positioned in front of other subjects), the mirror display system 100 may change the color, contrast, or brightness of the object 880 to be dark as indicated by reference number 802. As another example, when the depth value of the object 880 is smaller than the depth values of other subjects (i.e., when the object 880 is positioned behind other subjects), the mirror display system 100 may change the color, contrast, or brightness of the object 880 to be blur.

Figure 9:
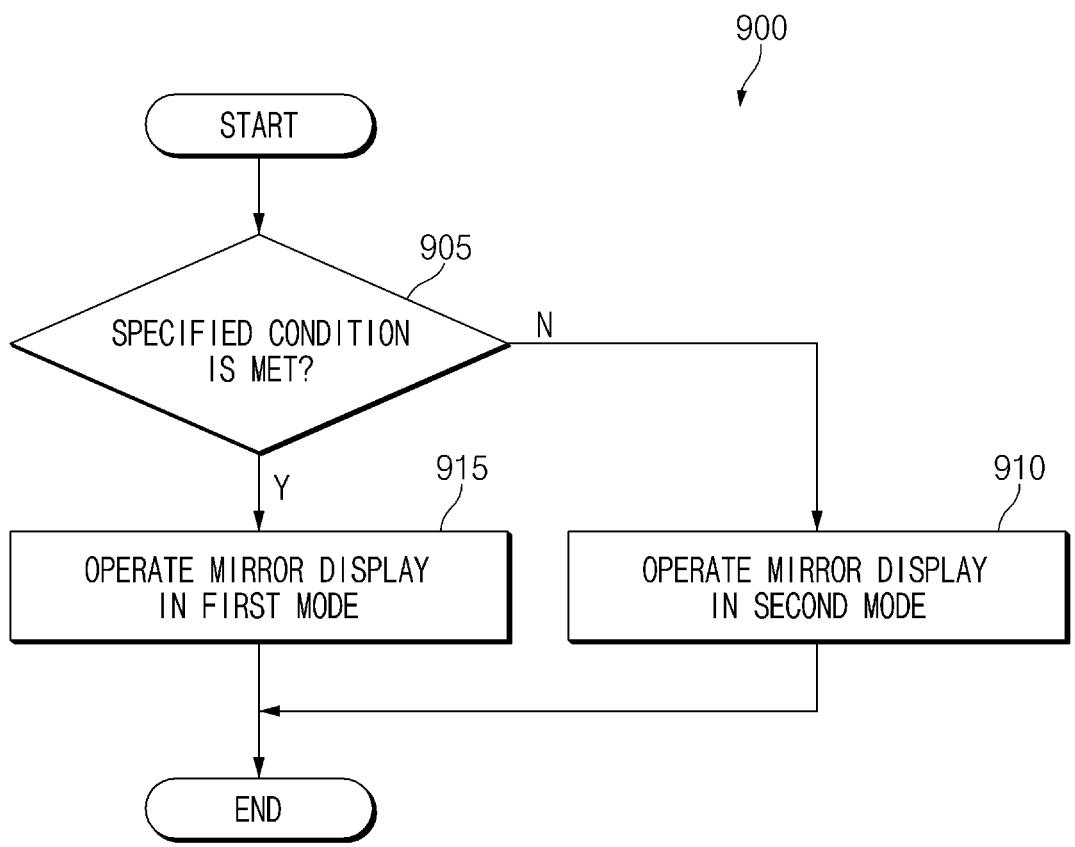
FIG. 9 is a flowchart illustrating an operation of a mirror display system that changes an operation mode of a mirror display based on a specified condition according to various embodiments.

FIG. 9 is a flowchart illustrating an operation of a mirror display system that changes an operation mode of a mirror display based on a specified condition according to various embodiments.

The mirror display 120 may operate in a first mode or a second mode. The first mode may refer to an operation mode in which the mirror display 120 determines the depth value of the object by using the gaze direction of the user and the incident angle of light reflected from the subject. In the first mode, the mirror display system 100 may more clearly measure the depth value of the mirror image and display the object based on the perspective of the mirror image. The second mode may refer to an operation mode in which the mirror display 120 controls the object to be arranged in front of other mirror images. In the second mode, the mirror display system 100 may arrange the object related to the multimedia service in front and preferentially provide the object related to the service to the user.

Referring to FIG. 9, in operation 905 of a method 900, the at least one control circuit 130 may determine whether the mirror display 120 satisfies a specified condition. In this document, specified conditions may include a case in which it is required to control the depth of an object when receiving user input. When there is a need to control the depth of an object, for example, it may include a case of providing an augmented reality service that displays the object having the depth value corresponding to the depth value of the mirror image. When the specified condition is not met, the at least one control circuit 130 may perform operation 910. When the specified condition is met, the at least one control circuit 130 may perform operation 915.

In operation 910, the at least one control circuit 130 may control the mirror display 120 to operate in the first mode. In the first mode, the at least one control circuit 130 may control to allow the depth value of the object displayed through the display to have the largest value. In other words, the at least one control circuit 130 may control the object to be displayed in front of the mirror images reflected in the optical mirror.

In operation 915, the at least one control circuit 130 may control the mirror display 120 to operate in the second mode. In the second mode, the at least one control circuit 130 may control the depth value of the object displayed through the display to be determined based on the depth values of the mirror images reflected in the optical mirror.

Through the above-described method, the mirror display system 100 may control the depth of the object to be changed corresponding to the importance of the information included in the object or the user input, thereby providing an environment in which the user may more easily identify the information about the object.

As described above, a mirror display system (e.g., the mirror display system 100 of FIG. 1) may include a sensor module (e.g., the sensor module 110 of FIG. 1), a mirror display (e.g., the mirror display 120 of FIG. 1) including an optical mirror (e.g., the optical mirror 112 of FIG. 2) and a display (e.g., the display 114 of FIG. 2), and at least one control circuit (e.g., the at least one control circuit 130 of FIG. 1) electrically connected to the sensor module and the mirror display, wherein the at least one control circuit may determine, through a sensor module, an incident angle formed by a light reflected from a subject and a normal line of the optical mirror based on a gaze direction of a user, determine a distance value between the subject and the mirror display, determine a depth value of the subject on the mirror display based on the incident angle and the distance value, and display an object having a depth value corresponding to the depth value of the subject through the display.

According to an embodiment, the at least one control circuit may determine a reflection angle formed by a light reflected by the optical mirror and the normal line of the optical mirror, and determine the incident angle equal to the reflection angle.

According to an embodiment, the at least one control circuit may correct an error in the distance value based on a location of the sensor module.

According to an embodiment, the display may include a three-dimension (3D) display panel, and the at least one control circuit may display the object through the 3D display by using a binocular parallax method.

According to an embodiment, the sensor module may include at least one of an ultrasonic sensor, an infrared sensor, a lidar sensor, a radar sensor, or a camera sensor.

According to an embodiment, the at least one control circuit may detect a gesture with at least a part of a body of the user, and control the object to move based on the gesture when a depth value of a subject conducting the gesture is equal to the depth value of the object.

According to an embodiment, the at least one control circuit may control the object to be displayed in front of or behind the subject based on whether the depth value of the object is greater than the depth value of the subject, and change a color or brightness of the object based on the depth value of the object.

According to an embodiment, the at least one control circuit may change an operation mode of the mirror display from a first mode in which the object is controlled to be arranged in front of the mirror display to a second mode in which the depth value of the object is controlled by using the distance value and the incident angle when the mirror display system meets a specified condition.

As described above, a method of a mirror display system includes determining, through a sensor module of the mirror display system, an incident angle formed by a light reflected from a subject and a normal line of an optical mirror, based on a gaze direction of a user reflected in the optical mirror, determining a distance value between the subject and a mirror display through the sensor module, determining a depth value of the subject on the mirror display based on the incident angle and the distance value, and displaying an object having a depth value corresponding to the depth value of the subject through a display.

According to an embodiment, the determining of the depth value of the subject may include determining a reflection angle formed by a light reflected by the optical mirror and the normal line of the optical mirror based on the gaze direction, and determining the incident angle equal to the reflection angle.

According to an embodiment, the method may further include correcting an error in the distance value based on a location of the sensor module.

According to an embodiment, the displaying of the object may include displaying the objet by using a binocular parallax method.

According to an embodiment, the method may further include detecting a gesture with at least a part of a body of the user, and controlling the object to move based on the gesture when a depth value corresponding to the at least a part of the body is equal to the depth value of the object.

According to an embodiment, the displaying of the object may include controlling the object to be displayed in front of or behind the subject based on whether the depth value of the object is greater than the depth value of the subject, and changing a color or brightness of the object based on the depth value of the object According to an embodiment, the method may further include changing an operation mode of the mirror display from a first mode in which the object is controlled to be arranged in front of the mirror display to a second mode in which the depth value of the object is controlled by using the distance value and the incident angle when the mirror display system meets a specified condition.

As described above, a mirror display system (e.g., the mirror display system 100 of FIG. 1) may include a sensor module (e.g., the sensor module 110 of FIG. 1), a mirror display (e.g., the mirror display 120 of FIG. 1) including an optical mirror (e.g., the optical mirror 112 of FIG. 2) and a display (e.g., the display 114 of FIG. 2), and at least one control circuit (e.g., the at least one control circuit 130 of FIG. 1) electrically connected to the sensor module and the mirror display, wherein the at least one control circuit may determine, through the sensor module, a reflection angle formed by a light reflected by the optical mirror and a normal line of the optical mirror, based on a gaze direction of a user reflected in the optical mirror, determine an incident angle formed by a light reflected from a subject and a normal line of the optical mirror, determine a distance value between the subject and the mirror display, determine a depth value of the subject on the mirror display based on the incident angle and the distance value, and display an object having a depth value corresponding to the depth value of the subject through a display.

According to an embodiment, the at least one control circuit may correct an error in the distance value based on a location of the sensor module.

According to an embodiment, the at least one control circuit may detect a gesture with at least a part of a body of the user, and control the object to move based on the gesture when a depth value of a subject conducting the gesture is equal to the depth value of the object.

According to an embodiment, the at least one control circuit may control the object to be displayed in front of or behind the subject based on whether the depth value of the object is greater than the depth value of the subject, and change a color or brightness of the object based on the depth value of the object.

According to an embodiment, the at least one control circuit may change an operation mode of the mirror display from a first mode in which the object is controlled to be arranged in front of the mirror display to a second mode in which the depth value of the object is controlled by using the distance value and the incident angle when the mirror display system meets a specified condition.

A mirror display system according to various embodiments of the disclosure may include various forms of devices. For example, the mirror display system may include a portable communication device (e.g., a smartphone), a computer device, a portable medical device, a camera, a wearable device, or a home electronic appliance. The mirror display system according to an embodiment of this disclosure may not be limited to the above-described devices.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments of the disclosure may be implemented as software including instructions that are stored in a machine-readable storage medium that is readable by a machine (e.g., a computer). The machine, which is a device that may invoke an instruction stored in the storage medium and be operable corresponding to the invoked instruction, may include an electronic device according to the embodiment of the disclosure. When the instruction is executed by a processor, the processor may perform the function corresponding to the instruction by using e other components under the control of the processor. The instruction may include codes generated or executed by a complier or an interpreter. The machine-readable storage medium may be provided in the form of a non-transitory storage medium. Wherein, the term "non-transitory" simply means that the storage medium is a tangible device, and does not include a signal, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™). If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A mirror display system comprising:
a sensor module;
a mirror display including an optical mirror and a display; and
at least one control circuit electrically connected to the sensor module and the mirror display, wherein the at least one control circuit is configured to:
obtain a gaze direction of a user through the sensor module,
determine an incident angle formed by a light reflected from a subject and a normal line of the optical mirror based on the gaze direction,
obtain a distance value between the subject and the mirror display through the sensor module,
determine a depth value of the subject on the mirror display based on the incident angle and the distance value,
display an object having a depth value corresponding to the depth value of the subject through the display,
identify a gesture using at least a part of a body of the user,
control the object to move based on the gesture when the at least a part of the body overlaps the object and a depth value of the at least a part of the body is equal to the depth value of the object,
when the depth value of the object is greater than the depth value of the at least a part of the body, change brightness of the object to be decreased, and
when the depth value of the object is smaller than the depth value of the at least a part of the body, change the brightness of the object to be increased.

2. The mirror display system of claim 1, wherein the at least one control circuit is configured to:
determine a reflection angle formed by a light reflected by the optical mirror and the normal line of the optical mirror, and determine the incident angle equal to the reflection angle.

3. The mirror display system of claim 1, wherein the at least one control circuit is configured to
correct an error in the distance value based on a location of the sensor module.

4. The mirror display system of claim 1, wherein the display includes a three-dimension (3D) display panel,
wherein the at least one control circuit is configured to display the object through the 3D display panel by using a binocular parallax method.

5. The mirror display system of claim 1, wherein the sensor module includes at least one of an ultrasonic sensor, an infrared sensor, a LIDAR (light detection and ranging) sensor, a RADAR (radio detecting and ranging) sensor, or a camera sensor.

6. The mirror display system of claim 1, wherein the at least one control circuit is configured to change an operation mode of the mirror display from a first mode in which the object is controlled to be arranged in front of the mirror display to a second mode in which the depth value of the object is controlled by using the distance value and the incident angle when the mirror display system meets a specified condition.

7. A method of a mirror display system, the method comprising:
   obtaining a gaze direction of a user reflected by an optical mirror, through a sensor module of the mirror display system;
   determining an incident angle formed by a light reflected from a subject and a normal line of the optical mirror, based on the gaze direction;
   obtaining a distance value between the subject and a mirror display through the sensor module;
   determining a depth value of the subject on the mirror display based on the incident angle and the distance value;
   displaying an object having a depth value corresponding to the depth value of the subject through a display;
   identifying a gesture using at least a part of a body of the user; and
   controlling the object to move based on the gesture when the at least a part of the body overlaps the object and a depth value of the at least a part of the body is equal to the depth value of the object;
   when the depth value of the object is greater than the depth value of the at least a part of the body, changing brightness of the object to be decreased; and
   when the depth value of the object is smaller than the depth value of the at least a part of the body, changing the brightness of the object to be increased.

8. The method of claim 7, wherein the determining of the depth value of the subject includes:
   determining a reflection angle formed by a light reflected by the optical mirror and the normal line of the optical mirror based on the gaze direction; and
   determining the incident angle equal to the reflection angle.

9. The method of claim 7, further comprising:
   correcting an error in the distance value based on a location of the sensor module.

10. The method of claim 7, wherein the displaying of the object includes:
    displaying the object by using a binocular parallax method.

11. The method of claim 7, further comprising:
    changing an operation mode of the mirror display from a first mode in which the object is controlled to be arranged in front of the mirror display to a second mode in which the depth value of the object is controlled by using the distance value and the incident angle when the mirror display system meets a specified condition.

* * * * *